Aug. 18, 1942.  C. M. ANDERSON  2,293,095
ONE-WAY CLUCH
Filed April 29, 1940  4 Sheets-Sheet 1
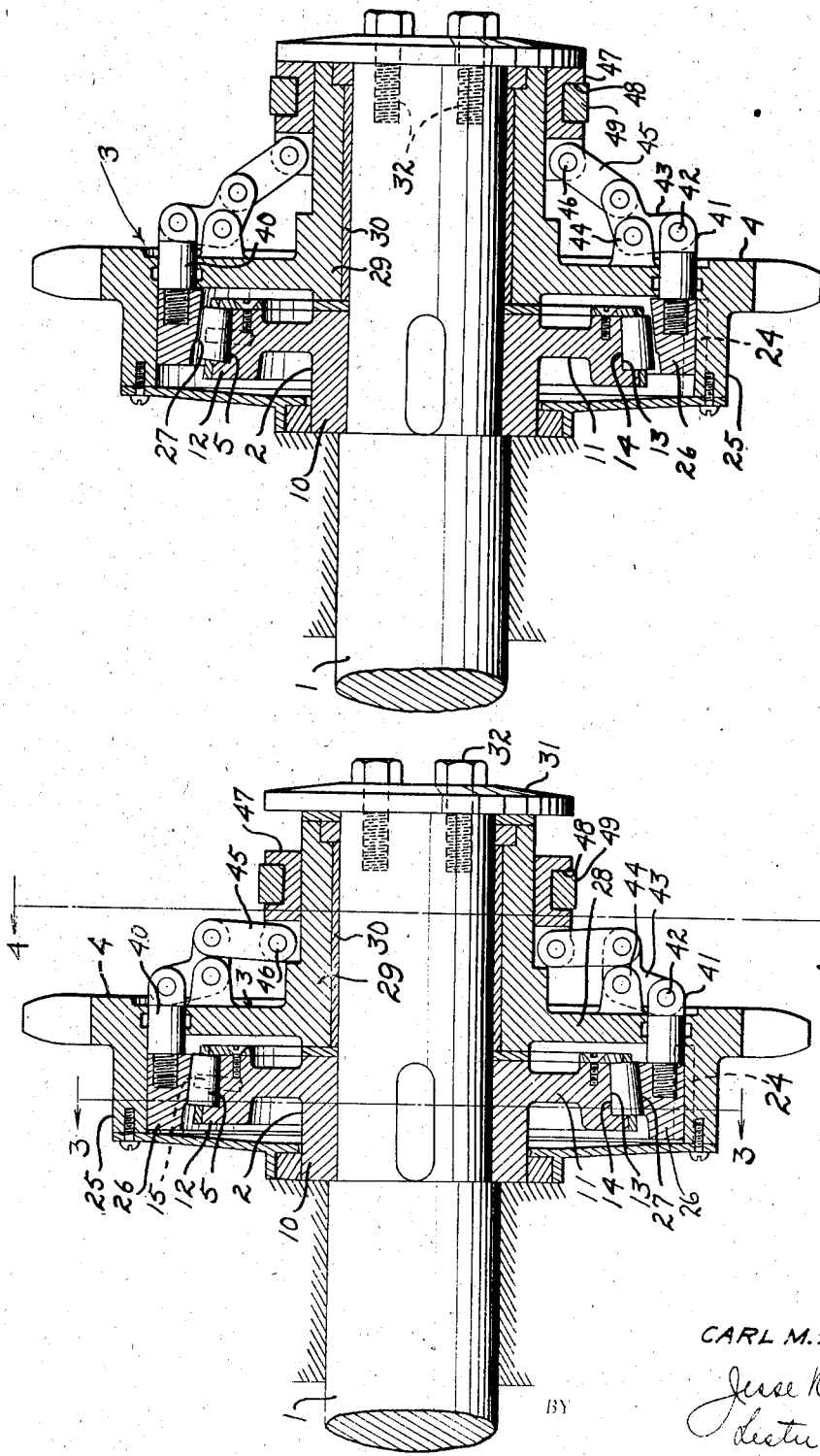
CARL M. ANDERSON
INVENTOR.
ATTORNEYS.

Aug. 18, 1942.  C. M. ANDERSON  2,293,095
ONE-WAY CLUCH
Filed April 29, 1940  4 Sheets-Sheet 2
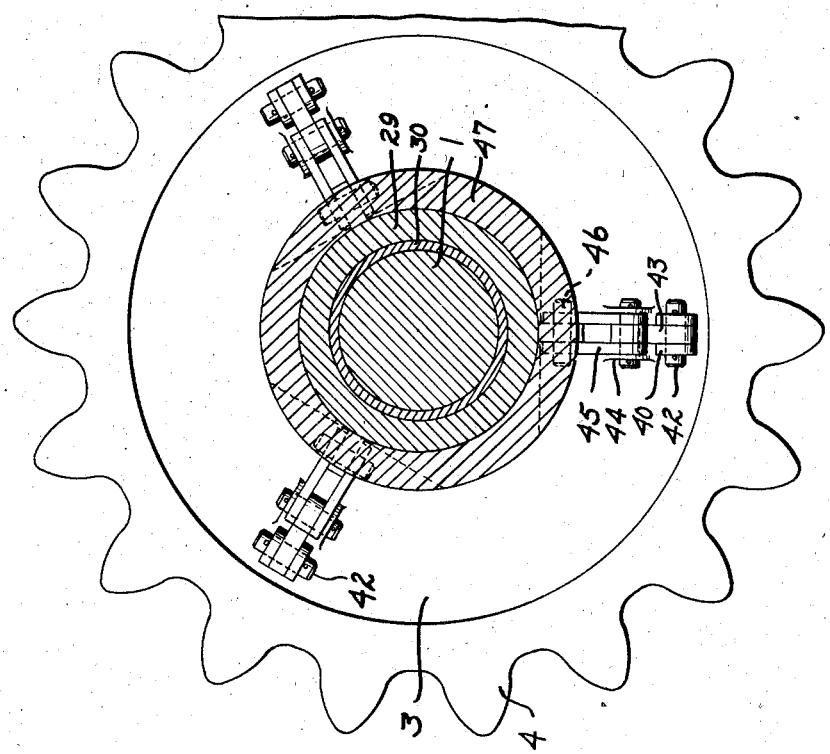
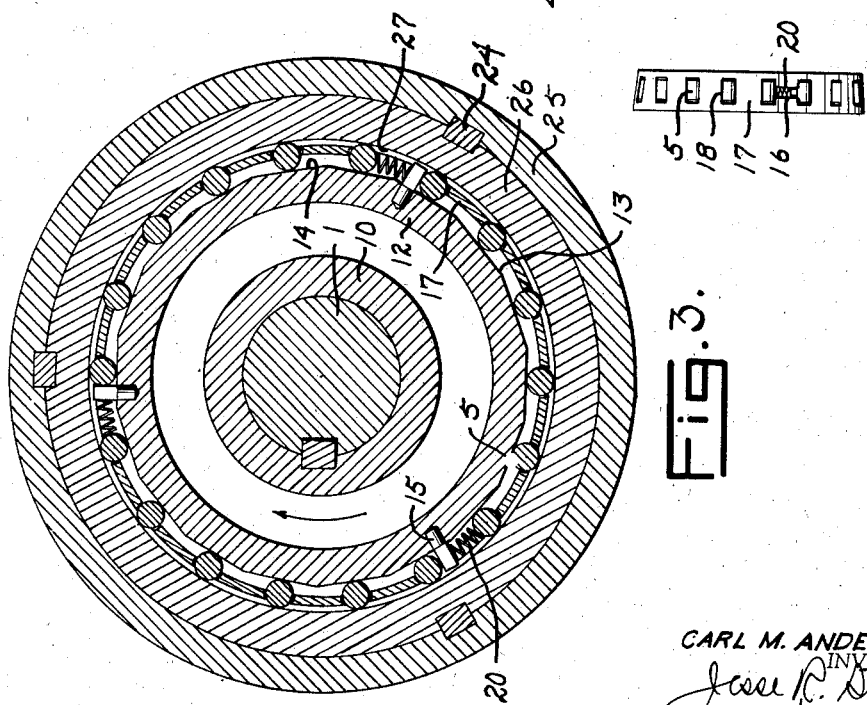
CARL M. ANDERSON
INVENTOR.
BY Jesse R. Stone
Lester B. Clark
ATTORNEYS.

Aug. 18, 1942.   C. M. ANDERSON   2,293,095
ONE-WAY CLUCH
Filed April 29, 1940   4 Sheets-Sheet 4

CARL M ANDERSON
INVENTOR.
BY Jesse R. Stone
Lester D. Clark
ATTORNEYS

Patented Aug. 18, 1942

2,293,095

UNITED STATES PATENT OFFICE 2,293,095

ONE-WAY CLUTCH

Carl M. Anderson, Corsicana, Tex., assignor, by mesne assignments, to The First National Bank of Corsicana, Corsicana, Tex., a corporation Application April 29, 1940, Serial No. 332,150

3 Claims. (Cl. 192—47)

This invention relates to an improvement in clutch mechanisms and more particularly to the friction type of one way clutch.

In the driving of heavy equipment such as that which is used in oil well drilling it is frequently necessary to effect a driving connection between driving and driven elements having a high physical property of inertia. In order to have the desired positive drive between such elements jaw clutches are frequently utilized but when utilized it is necessary for the elements of the connection to be brought substantially to a standstill or synchronous speed in order to avoid undesirable impact resulting from the positive engagement of the clutching elements. Likewise it is necessary in such construction to reduce the driving effort through the mechanism or to reverse the equipment in order to disengage the clutching elements.

The present invention is concerned with the provision of an engageable driving connecting between mechanisms and a connection which enables an accelerating engagement to take place preliminary to the locked or running engagement. The invention hence obviates the necessity of bringing parts of the mechanism to a standstill or to synchronous speed in order to effect an engagement and also enables ready disengagement of the driving connection.

The principal object of the invention is to provide a mechanism of the class described which is rugged in construction and which will effect a driving connection without undue stress being imparted to elements of the construction or the load driven thereby.

A further object is to provide a friction operated clutch wherein friction members are interposed between drive and driven members, such friction members being movable into a wedging position to effect a driving connection.

Still another object is to provide a one way friction clutch that may be readily disengaged under load.

Another object is to provide an improved clutch in which movable friction members are normally held in a retracted position but which are movable to a position of increasing engagement after a manual operation of the clutch has been effected.

Other objects and advantages of the invention will be apparent from the following specification considered in connection with the drawings in which:

Fig. 1 is a vertical sectional view thru an illustrative embodiment of the invention showing the relative position of parts when the clutch is engaged;

Fig. 2 is a view similar to that shown in Fig. 1 but showing the relative position of parts when the clutch is disengaged;

Fig. 3 is a vertical sectional view taken on line 3—3 in Fig. 1;

Fig. 4 is a vertical sectional view taken on line 4—4 in Fig. 1;

Fig. 5 is an elevational view of the friction members and their associated retainer;

Figure 6:
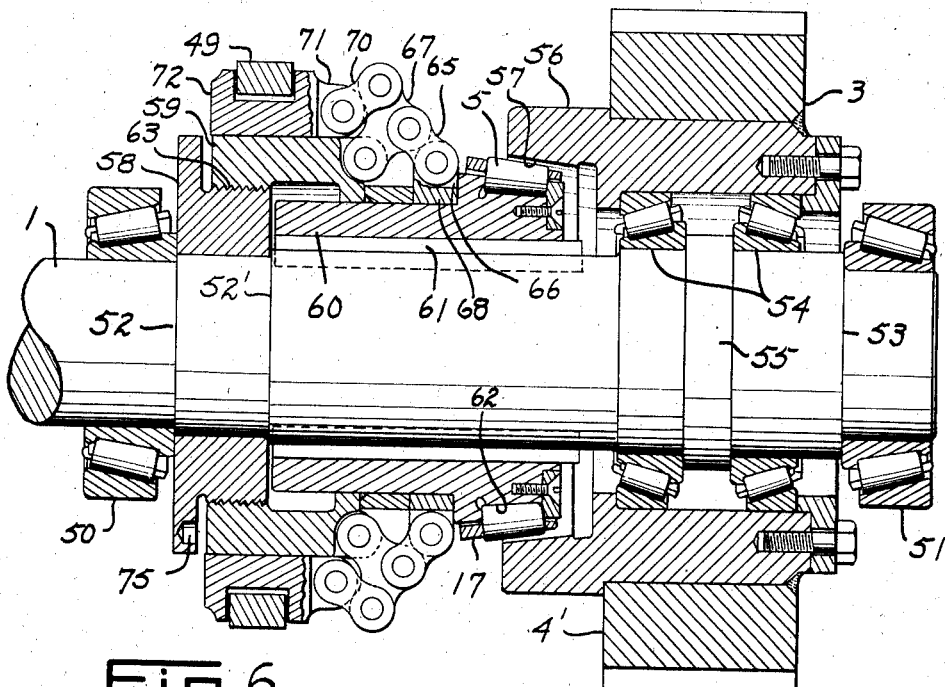
Fig. 6 is a sectional view thru an alternative embodiment in which the driving element is movable to effect engagement and disengagement of the clutch, the parts being shown in their relative positions when the clutch is disengaged.

The embodiment of the invention illustrated in Figs. 1 to 5 inclusive comprises a drive shaft 1 to which is affixed a clutch member 2 surrounded by a composite driven clutch member generally referred to as 3 and which is operatively connected as by means of a sprocket 4 to the mechanism to be driven thereby. A plurality of friction members 5 are interposed between the drive and driven clutch members 2 and 3 to effect a driving connection therebetween in a manner to be more fully described.

The driving clutch member 2 comprises a hub portion 10, a web portion 11 and a peripheral ring portion 12 which has an axially tapered outer face 13 made up of a plurality of flattened surfaces 14 (Fig. 3), whereby the member has a polygonal cross section.

A plurality of studs or stops 15 shown as three in number project outwardly from the surface 13 and enter slots 16 (Fig. 5) in the retainer 17 which has axial openings 18 to receive the friction members or rollers 5. A spring 20 is positioned in each of the slots 16 and abuts the associated stud 15 and the adjacent roller 5 so that the retainer-roller assembly is normally held in position so that each of the rollers 5 is held approximately centrally of one of the flattened surfaces 14.

The composite driven clutch member 3 has a portion 25 which concentrically surrounds the frusto-pyramidal surface 13, and a ring 26 is splined upon keys 24 within the portion 25 so that such member is movable axially but non-rotatably within the portion 25. The ring 26 has a tapered inner surface 27 in spaced opposed relation to the surface 13 on the driving clutch member 2. The portion 25 is secured to a web portion 28 which is in turn attached to the hub 29, surrounding a bearing 30 on the shaft 1. It is thus apparent that the driving assembly or composite clutch element 3 is rotatably mounted upon the shaft 1 where it is held in place by means of the washer 31 secured to the shaft 1 by means of cap screws 32.

It is believed apparent that upon axial movement of the ring 26 to the left as shown in Figs. 1 and 2, the surface 27 moves toward the tapered surface 13, whereby the friction members 5 will be engaged by each of the elements 2 and 26. Such engagement will cause the friction members 5 to move over the adjacent surfaces which have a converging relation. This movement will cause the springs 20 to become compressed as the friction members 5 move to a position in which the friction is sufficiently great that the adjacent members are locked relative to each other.

In order to effect the desired movement of the ring 26 so that functioning will occur in the manner just described, a plurality of studs 40 are secured thereto and pass thru openings in the web 28. The outer end of each of these studs is pivotally attached at 42 to one end of a bell crank lever 43 mounted upon ears 44 upon the exterior of the web 28. The other end of each of the bell crank levers 43 is pivotally attached to a link 45 having a pivot 46 upon the inner end of collar 47 surrounding the hub 29 and rotatable therewith.

The collar 47 is provided with a peripheral groove 48 to receive a yoke 49 which may be moved axially of the shaft 1. It is believed apparent that as the collar 47 is moved to the left as shown in Figs. 1 and 2 the ring 26 will likewise be moved toward the left to effect engagement of the clutch in the manner above described. Conversely as the collar 47 is moved to the right the ring 26 is likewise moved and disengagement of the clutch is effected.

In view of the foregoing description of the embodiment of the invention illustrated in Figs. 1 to 5 inclusive the operation of such construction is believed apparent. Attention will be directed to the fact that in event the speed of the member 4 tends to exceed that of the driving member 2 and the shaft 1 the friction members 15 will return to a position centrally of the flattened surface 14 in which case there will be little friction between these members and the surfaces on opposite sides thereof and the clutch may overrun if the differential driving force is sufficiently great to overcome this friction.

Figure 7:
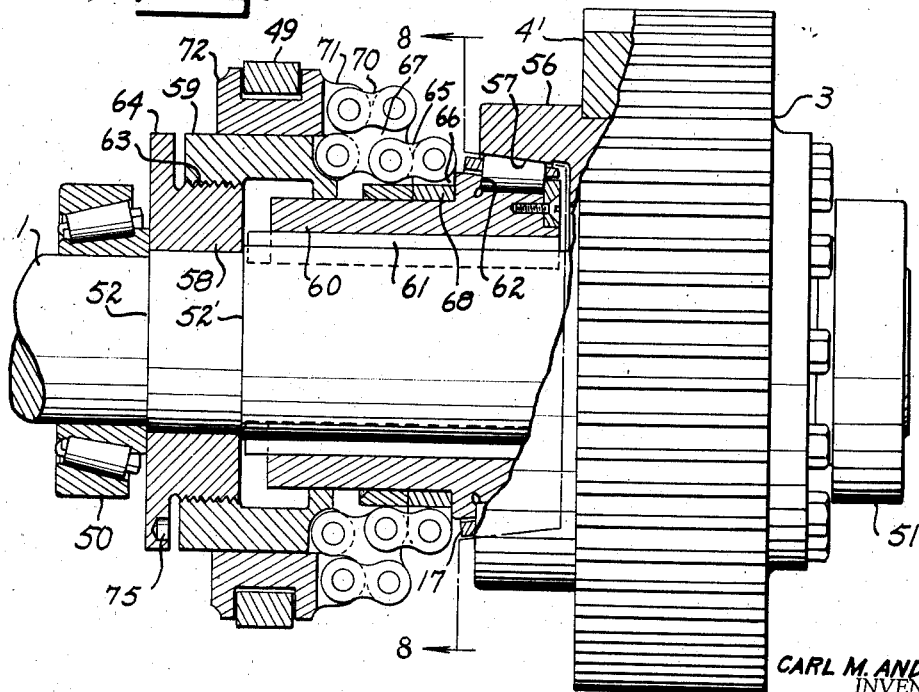
Fig. 7 is a partial sectional view similar to that shown in Fig. 6 but showing the relative position of parts when the clutch is engaged.
Figure 8:
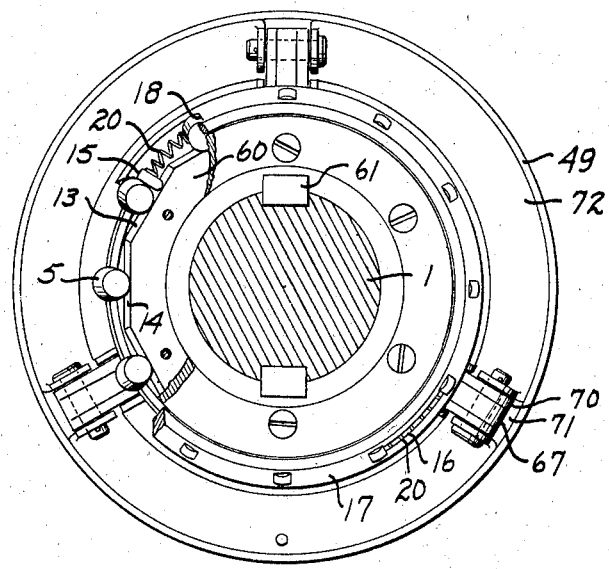
Fig. 8 is a view partly in section taken on line 8—8 in Fig. 7.
Figure 9:
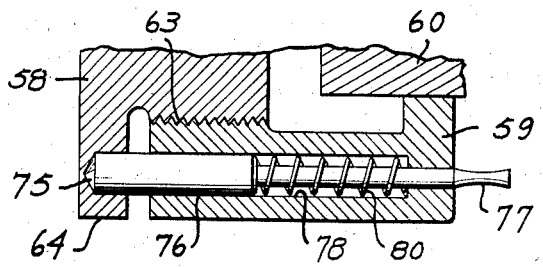
Fig. 9 is an enlarged detail showing the manner of locking the clutch in adjusted position.

In Figs. 6 to 9 there is shown a modification in which driven member 3 is maintained in fixed position axially of the shaft 1 and the driving element is movable axially of such shaft in order to effect the desired engagement of the clutch.

Parts which are identical to those of the previously described embodiment are identified by the same reference characters.

The shaft 1 is mounted upon spaced anti-friction bearings 50 and 51, shoulders 52 and 53 on the shaft being provided to engage the opposed faces of the inner raceways of these bearings in order to prevent axial movement of the shaft and the associated elements. The driven member 3 is rotatably mounted upon the shaft 1 by means of antifriction bearings 54 of which the raceways engage a peripheral flange 55 upon the shaft so that this member is restrained from movement axial of the shaft. The member 4' is shown as a gear wheel so that power may be imparted to mechanism to be driven thereby thru the use of a complementary gear (not shown). Attention is directed to the fact that the member 3 is composite and includes an inner ring member 56 having an internal tapered or frustoconical surface 57 which serves the same purpose as does the surface 27 in the embodiment already described.

The driving assembly of this embodiment comprises a collar 58 which is mounted upon a stepped portion of the shaft between the bearing 50 and the shoulder 52' on the shaft 1, and to which is threadably attached an adjusting sleeve 59 which extends axially of the shaft. The inner end of the sleeve 59 fits closely about the surface of a driving ring 60 which is axially slidable of the shaft 1 but non-rotatably mounted thereon by means of the spline keys 61 extending longitudinally of the shaft.

The outer end of the driving ring 60 extends interiorly of the ring 56 and is provided with a peripheral groove 62 of which the bottom comprises a plurality of flattened surfaces 14 whereby there is provided a frusto-pyramidal surface which receives the friction members 5 surrounded by the retainer 17 as already described in the previous embodiment.

The driving sleeve 60 is movable upon the spline keys 61 by means of a linkage arrangement comprising a link 65 pivotally connected to an ear 66 attached to a ring 68. The opposite end of the link 65 is pivoted to a bell crank lever 67. One end of this lever is attached to an ear on the adjacent ring 59 so that movement of the bell crank lever 67 to the right, as viewed in the figures, will cause the driving ring 60 to move axially of the shaft and interiorly of the ring 56. Movement of the bell crank lever 67 is effected by means of a link 70 attached thereto and also to an ear 71 on the clutch throwout ring 72. This throwout ring is movable in a manner well known in the art by means of the yoke 49 as already described.

In the modified construction just described it seems apparent that desired movement of the throwout collar 72 toward the right causes the driven clutch assembly to move in that direction and thereby to bring the rollers 5 into engagement with the surface 57. It is understood that the roller-retainer assembly is normally held in such position that the rollers lie approximately central of each of the surfaces 13, such condition being brought about by virtue of the stops 16 and the adjacent springs 20. Initial engagement will, however, tend to move this assembly in a direction to cause the friction members 5 to move into the converging space between the surfaces 13 and 57. Accordingly the frictional engagement will increase during such movement until a locked condition between the driving and driven members results.

In order to provide desired adjustment of the clutch whereby a locked condition is provided when the toggle connection between the ring 59 and the driving ring 60 is moved to extended position, a threaded connection 63 is provided between the collar 58 and the ring 59. The collar 58 has a radially extending flange 64 provided with a plurality of indentations 75 on its inner face, such indentations being adapted to receive the enlarged end 76 of a pin 77 positioned within an axially extending recess 78 in the ring 59. By pulling the pin 77 outwardly against the force exerted by the spring 80, it is apparent that the collar 59 with the toggle links and ring 68 can be rotated relative to the remainder of the assembly whereby the desired relative position of these members may be obtained. The members are then locked in position by permitting the enlargement 76 to enter one of the indentations 75 in the collar 58.

The invention provides a friction clutch which may be engaged without the necessity of bringing the respective drive and driven elements to a standstill or to a synchronous speed. This is possible since the initial driving force exerted as the tapered or frusto-conical surface 27 or 57 contacts the friction members 5, is sufficient to produce driving torque whereby the rotation of the driven element is initiated and accelerated preliminary to sufficient rolling movement of the friction members 5 upon the plane surfaces to bring such members into locking engagement with the driving and driven elements.

Broadly the invention comprehends a one way clutch of the friction type which is so constructed as to effect a driving connection without undue shock to the component parts of the construction or to the load driven thereby and one which may be readily disengaged without regard to load conditions.

What is claimed is:

1. In combination, concentric drive and driven members, a plurality of substantially plane outwardly facing surfaces on the drive member, an inner annular surface on the driven member in opposed relation to said plane surfaces, a plurality of rollers between the opposed surfaces, means normally holding each of said rollers centrally of one of the plane surfaces and operable to restrain the rollers from movement in one direction from the central position on said surfaces, and means for effecting engagement of each of the rollers by said members whereby said rollers move upon the plane surfaces in the other direction to produce locking engagement between the members.

2. In a clutch, the combination of, concentric drive and driven members having spaced opposed surfaces, one of said surfaces comprising a plurality of plane surfaces converging towards the other of the surfaces, friction members between said plane surfaces and the opposed surface, means normally holding said friction members in a position centrally of said plane surfaces, and operable to restrain the friction members from movement in one direction from the central position on said surfaces, and means operable to move one of said concentric members toward the other of the members to effect movement of the friction members in the other direction and into frictional engagement with the converging surfaces.

3. In a clutch the combination of, concentric drive and driven members, a frusto-pyramidal surface on one of the members, a frusto-conical surface on the other of the members in opposed relation with the first mentioned surface, friction members interposed between the faces of the frusto-pyramidal surface and the opposed frusto-conical surface, a retainer for said friction members, and means resiliently urging said retainer to normally hold the friction members centrally of the faces of the frusto-pyramidal surface.

CARL M. ANDERSON.